United States Patent
Kakinuma et al.

(10) Patent No.: US 10,954,341 B2
(45) Date of Patent: Mar. 23, 2021

(54) POLYMERIZABLE COMPOSITION FOR OPTICAL MATERIAL, OPTICAL MATERIAL, PROCESS FOR PREPARING POLYMERIZABLE COMPOSITION FOR OPTICAL MATERIAL, AND METHOD OF MANUFACTURING OPTICAL MATERIAL

(71) Applicant: MITSUI CHEMICALS, INC., Tokyo (JP)

(72) Inventors: Naoyuki Kakinuma, Omuta (JP); Koji Suesugi, Arao (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 15/759,683

(22) PCT Filed: Sep. 15, 2016

(86) PCT No.: PCT/JP2016/077232
§ 371 (c)(1),
(2) Date: Mar. 13, 2018

(87) PCT Pub. No.: WO2017/047685
PCT Pub. Date: Mar. 23, 2017

(65) Prior Publication Data
US 2018/0340044 A1    Nov. 29, 2018

(30) Foreign Application Priority Data

Sep. 16, 2015 (JP) .............................. JP2015-183427

(51) Int. Cl.
| | | |
|---|---|---|
| *G02B 1/08* | (2006.01) | |
| *C08G 75/08* | (2006.01) | |
| *C08L 81/02* | (2006.01) | |
| *C08K 5/3467* | (2006.01) | |
| *G02B 1/04* | (2006.01) | |
| *C08K 5/17* | (2006.01) | |
| *C08G 75/02* | (2016.01) | |
| *B29D 11/00* | (2006.01) | |
| *C08K 5/3475* | (2006.01) | |
| *C08K 5/56* | (2006.01) | |
| *G02C 7/10* | (2006.01) | |
| *B29K 105/00* | (2006.01) | |

(52) U.S. Cl.
CPC ........ *C08G 75/08* (2013.01); *B29D 11/00442* (2013.01); *C08G 75/02* (2013.01); *C08K 5/17* (2013.01); *C08K 5/3467* (2013.01); *C08K 5/3475* (2013.01); *C08K 5/56* (2013.01); *C08L 81/02* (2013.01); *G02B 1/04* (2013.01); *G02B 1/041* (2013.01); *G02C 7/108* (2013.01); *B29K 2105/0005* (2013.01); *B29K 2105/0032* (2013.01)

(58) Field of Classification Search
CPC ....................................................... G02B 1/08
See application file for complete search history.

(56) References Cited

U.S. PATENT DOCUMENTS

| | | |
|---|---|---|
| 7,506,977 B1 | 3/2009 | Aiiso |
| 8,394,920 B2 | 3/2013 | Takeuchi et al. |
| 9,933,635 B2 | 4/2018 | Hashimoto et al. |
| 10,202,485 B2 | 2/2019 | Murakami |
| 2010/0331515 A1 | 12/2010 | Takeuchi et al. |
| 2013/0155507 A1* | 6/2013 | Ryu ........................ C09B 47/00 359/487.02 |

FOREIGN PATENT DOCUMENTS

| | | | |
|---|---|---|---|
| CN | 103052904 A | | 4/2013 |
| EP | 2243798 A1 | | 10/2010 |
| EP | 2 980 113 A1 | | 2/2016 |
| JP | 2004-256655 A | | 9/2004 |
| JP | 2004256655 | * | 9/2004 |
| JP | 2005-120303 A | | 5/2005 |
| JP | 2008-134618 A | | 6/2008 |
| JP | 2011-237730 A | | 11/2011 |
| JP | 2014-156067 A | | 8/2014 |
| JP | 2015-118122 A | | 6/2015 |

(Continued)

OTHER PUBLICATIONS

International Search Report (PCT/ISA/210) dated Nov. 1, 2016, by the Japan Patent Office as the International Searching Authority for International Application No. PCT/JP2016/077232.
Written Opinion (PCT/ISA/237) dated Nov. 1, 2016, by the Japan Patent Office as the International Searching Authority for International Application No. PCT/JP2016/077232.
Knels et al., Blue light stress in retinal neuronal (R28) cells is dependent on wavelength range and irradiance, European Journal of Neuroscience, vol. 34, 2011, pp. 548-558, Federation of European Neuroscience Societies and Blackwell Publishing Ltd. DOI: 10.1111/j.1460-9568.2011.07790.x.
Notification of Reason for Refusal issued by the Korean Intellectual Property Office in corresponding Korean Patent Application No. 10-2018-7007160 dated Jan. 30, 2019 (17 pages including partial English translation).

(Continued)

*Primary Examiner* — Monique R Peets
(74) *Attorney, Agent, or Firm* — Buchanan, Ingersoll & Rooney PC

(57) ABSTRACT

A polymerizable composition for an optical material includes an episulfide compound (A); an organic coloring matter (B); an UV absorber (C); and a polymerization catalyst (D), wherein the organic coloring matter (B) has a main absorption peak (P) between 565 nm and 605 nm in a visible light absorption spectrum, an absorption coefficient (ml/g·cm) of a peak apex (Pmax) exhibiting a maximum absorption coefficient of (P) is equal to or greater than $0.5 \times 10^5$, a peak width in an absorbance of ¼ of an absorbance of (Pmax) of (P) is equal to or less than 50 nm, a peak width in an absorbance of ½ of the absorbance of (Pmax) of (P) is equal to or less than 30 nm, and a peak width in an absorbance of ⅔ of the absorbance of (Pmax) of (P) is in a range of equal to or less than 20 nm.

14 Claims, 1 Drawing Sheet

(56) References Cited

FOREIGN PATENT DOCUMENTS

| KR | 10-2010-0111745 A | 10/2010 |
|---|---|---|
| WO | 2014/125738 A1 | 8/2014 |
| WO | 2014/133111 A1 | 9/2014 |
| WO | 2014/157664 A1 | 10/2014 |
| WO | 2015/088011 A1 | 6/2015 |

OTHER PUBLICATIONS

Extended Search Report issued by the European Patent Office in corresponding European Patent Application No. 16846556.5-1107 dated Apr. 12, 2019 (6 pages).

Communication pursuant to Article 94(3) EPC dated Mar. 19, 2020, by the European Patent Office in corresponding European Patent Application No. 16846556.5. (9 pages).

Office Action dated Nov. 14, 2019, by the State Intellectual Property Office of the People's Republic of China corresponding Chinese Patent Application No. 201680052770.8. (8 pages).

\* cited by examiner

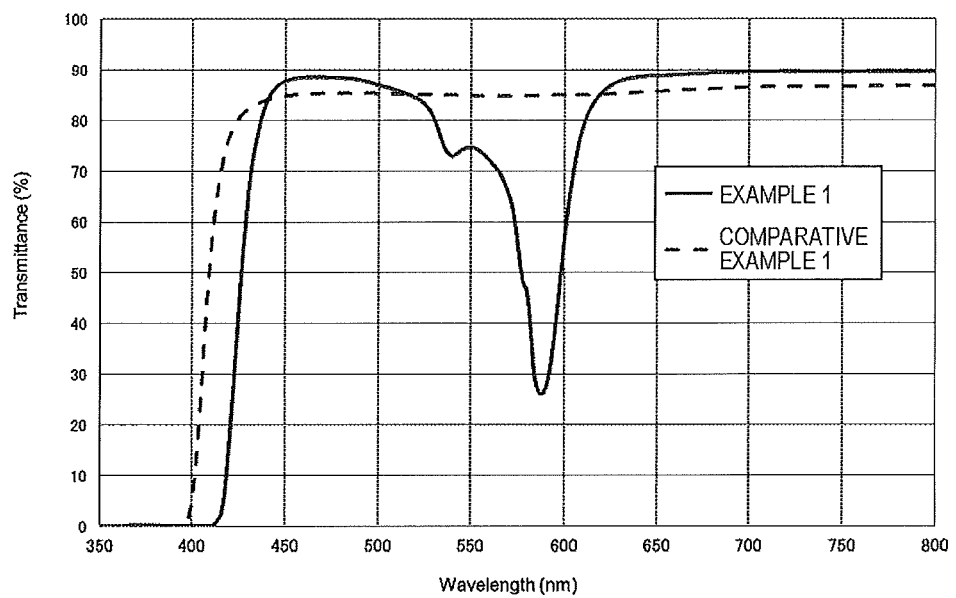

POLYMERIZABLE COMPOSITION FOR OPTICAL MATERIAL, OPTICAL MATERIAL, PROCESS FOR PREPARING POLYMERIZABLE COMPOSITION FOR OPTICAL MATERIAL, AND METHOD OF MANUFACTURING OPTICAL MATERIAL

TECHNICAL FIELD

The present invention relates to a polymerizable composition for an optical material, an optical material, a process for preparing a polymerizable composition for an optical material, and a method of manufacturing an optical material.

BACKGROUND ART

Plastic lenses are lighter and harder to be broken than inorganic lenses, and thus are rapidly spreading as optical materials such as spectacle lenses and camera lenses, recently.

With respect to an optical material, for example, Patent Document 1 discloses a polymerizable composition including a composition containing a compound having an episulfide group and a compound having two or more mercapto groups in a molecule and indicates that an optical material having a high refractive index and low dispersion can be obtained by causing the composition to be a resin by polymerization.

Here, recently, with respect to an optical material such as a spectacle lens, in order to reduce visual fatigue and the like by clarifying the contours and colors of objects, it is desired to improve the contrast of an object visually recognized through the lens.

In order to improve the contrast, it is necessary to selectively shield (cut) the wavelength band which is likely to cause glare as much as possible. For example, a neodymium compound can highly selectively absorb visible light near 585 nm, and it is known that a spectacle lens including an organic coloring matter such as a neodymium compound or a tetraazaporphyrin compound has improved contrast of the recognized object. The reason that a rare earth metal compound such as a neodymium compound can improve the contrast of the recognized object is that the peak shape of the absorption spectrum in an absorption wavelength band in a visible light region is extremely sharp, that is, the absorption wavelength range is narrow and wavelength selectivity is high. As this wavelength selectivity is high, it is possible to obtain an effect of having a large transmittance in a wavelength band that is necessary for visibility and selectively absorbing a wavelength band that adversely affects glare.

In the same manner as the neodymium compound, the tetraazaporphyrin compound can provide excellent antiglare performances and improved contrast to a spectacle lens. That is, since the light transmittance at other than around 585 nm is good and a bright field of vision can be secured due to the sharpness of the peak at a specific absorption wavelength, it is possible to provide a spectacle lens with an extremely good balance between antiglare characteristics and visibility (contrast).

A method of previously dissolving a tetraazaporphyrin compound in a monomer composition and then performing polymerization to obtain a lens is disclosed in Examples of Patent Document 2. A method of mixing a tetraazaporphyrin compound with a prepolymer and then performing heat curing to obtain a lens is disclosed in Examples of Patent Document 3.

Meanwhile, in the related art, adverse effects due to exposure of the eye to ultraviolet (UV) rays are regarded as problems. Recently, the influence on the eyes such as feeling fatigue and pain of the eyes due to blue light included in light emitted from natural light, a liquid crystal display of office equipment, and a display of a mobile device such as a smart phone or a mobile phone has been a problem, and thus it is desired to reduce the amount of exposure of the eye from UV rays to blue light of a relatively short wavelength of about 400 to 420 nm.

That is, another function provided to the plastic lens is an UV cutting function. In recent years, a plastic lens having a function of cutting UV rays has been developed.

Here, the influence of blue light having a short wavelength of about 420 nm on the eyes is disclosed in Non-Patent Document 1.

In this document, damage to retinal neuronal cells (cultured retinal neuronal R28 cells of a rat) by irradiation with blue LED lights having different peak wavelengths of 411 nm and 470 nm is verified. As a result, it is presented that, irradiation with blue light having a peak wavelength of 411 nm (4.5 W/m$^2$) causes cell death of retinal neuronal cells within 24 hours (hs), while, with blue light having a peak wavelength of 470 nm, cells were not changed even in the same amount of irradiation, and it is presented that, suppression of exposure of light having a wavelength of 400 to 420 nm is important for prevention of ocular disorders.

For a long period of time, there is a concern that, exposure of the eyes to blue light causes fatigue of the eyes or stress, and it is considered that, exposure of the eyes to blue light causes age-related macular degeneration.

RELATED DOCUMENTS

Patent Documents

[Patent Document 1] Japanese Laid-Open Patent Publication No. 2004-256655
[Patent Document 2] Japanese Laid-Open Patent Publication No. 2008-134618
[Patent Document 3] Japanese Laid-Open Patent Publication No. 2011-237730
[Non-Patent Document 1] The European journal of neuroscience, vol. 34, Iss. 4, 548 to 558, (2011)

SUMMARY OF THE INVENTION

Problems to be Solved by the Invention

That is, in this technical field, development of an optical material having an excellent effect of blocking UV rays or blue light, being colorless transparent, and having excellent external appearance is strongly desired, and development of a polymerizable composition capable of realizing such optical material is also desired. In view of the above circumstances, the present invention is to provide a polymerizable composition capable of obtaining an optical material having an excellent effect of blocking UV rays or blue light, being colorless transparent, and having excellent external appearance.

Means for Solving the Problems

The present inventors have found that, by suitably combining components forming the polymerizable composition, for a cured product obtainable, an external appearance is excellent, and an effect of blocking UV rays and blue light can be effectively improved.

That is, the present invention can be provided below.

[1] A polymerizable composition for an optical material, including: an episulfide compound (A);
an organic coloring matter (B);
an UV absorber (C); and
a polymerization catalyst (D),
in which the organic coloring matter (B) has a main absorption peak (P) between 565 nm and 605 nm in a visible light absorption spectrum measured with a chloroform or toluene solution of the organic coloring matter (B), an absorption coefficient (ml/g·cm) of a peak apex (Pmax) exhibiting a maximum absorption coefficient of the peak (P) is equal to or greater than $0.5 \times 10^5$, a peak width in an absorbance of ¼ of an absorbance of the peak apex (Pmax) of the peak (P) is equal to or less than 50 nm, a peak width in an absorbance of ½ of the absorbance of the peak apex (Pmax) of the peak (P) is equal to or less than 30 nm, and a peak width in an absorbance of ⅔ of the absorbance of the peak apex (Pmax) of the peak (P) is in a range of equal to or less than 20 nm.

[2] The polymerizable composition for an optical material according to [1], in which the episulfide compound (A) is a compound represented by Formula (1),

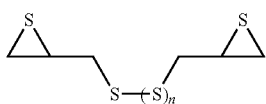

(1)

(in Formula (1), n represents 0 or 1).

[3] The polymerizable composition for an optical material according to [1] or [2], in which the organic coloring matter (B) is a tetraazaporphyrin compound represented by Formula (2),

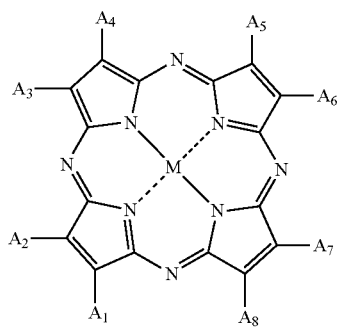

(2)

(in Formula (2), $A_1$ to $A_8$ each independently represent a hydrogen atom, a halogen atom, a nitro group, a cyano group, a hydroxy group, an amino group, a carboxyl group, a sulfonic acid group, a linear, branched or cyclic alkyl group having 1 to 20 carbon atoms, an alkoxy group having 1 to 20 carbon atoms, an aryloxy group having 6 to 20 carbon atoms, a monoalkylamino group having 1 to 20 carbon atoms, a dialkylamino group having 2 to 20 carbon atoms, a dialkylamino group having 7 to 20 carbon atoms, an aralkyl group having 7 to 20 carbon atoms, an aryl group having 6 to 20 carbon atoms, a heteroaryl group, an alkylthio group having 6 to 20 carbon atoms, and an arylthio group having 6 to 20 carbon atoms, $A_1$ to $A_8$ may form a ring other than an aromatic ring, through a linking group, and M represents two hydrogen atoms, a divalent metal atom, a divalent monosubstituted metal atom, a tetravalent disubstituted metal atom, or an oxy metal atom).

[4] The polymerizable composition for an optical material according to [3], in which, in a tetraazaporphyrin compound represented by Formula (2), M represents a divalent copper atom.

[5] The polymerizable composition for an optical material according to [3] or [4], in which the tetraazaporphyrin compound is represented by Formula (3),

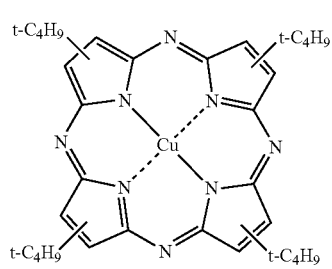

(3)

(in Formula (3), Cu represents divalent copper, $t-C_4H_9$ represents a tertiary-butyl group, and substitution positions of four substituents thereof are any one of $A_1$ and $A_2$, $A_3$ and $A_4$, $A_5$ and $A_6$, and $A_7$ and $A_8$ in Formula (2)).

[6] The polymerizable composition for an optical material according to any one of [1] to [5], in which the UV absorber (C) includes a benzophenone-based compound, a triazine-based compound, and a benzotriazole-based compound.

[7] The polymerizable composition for an optical material according to any one of [1] to [6], in which the polymerization catalyst (D) is an amine compound.

[8] The polymerizable composition for an optical material according to any one of [1] to [7], further including a polythiol compound (E).

[9] An optical material formed of a cured product of the polymerizable composition for an optical material according to any one of [1] to [8].

[10] A process for preparing a polymerizable composition for an optical material, including: a step of dissolving an organic coloring matter (B) in a polymerization catalyst (D) so as to obtain a mixed solution; and
a step of mixing an episulfide compound (A), an UV absorber (C), and the mixed solution so as to obtain the polymerizable composition for an optical material,
in which the organic coloring matter (B) has a main absorption peak (P) between 565 nm and 605 nm in a visible light absorption spectrum measured with a chloroform or toluene solution of the organic coloring matter (B), an absorption coefficient (ml/g·cm) of a peak apex (Pmax) exhibiting a maximum absorption coefficient of the peak (P) is equal to or greater than $0.5 \times 10^5$, a peak width in an absorbance of ¼ of an absorbance of the peak apex (Pmax) of the peak (P) is equal to or less than 50 nm, a peak width in an absorbance of ½ of the absorbance of the peak apex (Pmax) of the peak (P) is equal to or less than 30 nm, and a peak width in an absorbance of ⅔ of the absorbance of the peak apex (Pmax) of the peak (P) is in a range of equal to or less than 20 nm.

[11] The process for preparing a polymerizable composition for an optical material according to [10], in which the episulfide compound (A) is a compound represented by Formula (1),

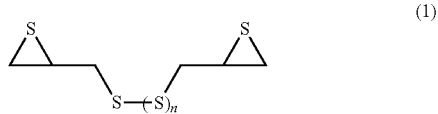

(1)

(in Formula (1), n represents 0 or 1).

[12] The process for preparing a polymerizable composition for an optical material according to [10] or [11], in which the organic coloring matter (B) is a tetraazaporphyrin compound represented by Formula (2),

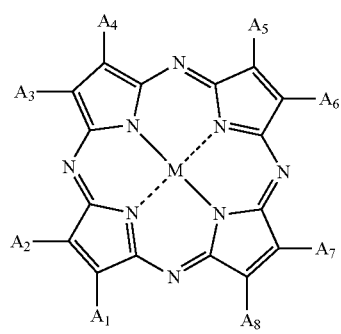

(2)

(in Formula (2), $A_1$ to $A_8$ each independently represent a hydrogen atom, a halogen atom, a nitro group, a cyano group, a hydroxy group, an amino group, a carboxyl group, a sulfonic acid group, a linear, branched or cyclic alkyl group having 1 to 20 carbon atoms, an alkoxy group having 1 to 20 carbon atoms, an aryloxy group having 6 to 20 carbon atoms, a monoalkylamino group having 1 to 20 carbon atoms, a dialkylamino group having 2 to 20 carbon atoms, a dialkylamino group having 7 to 20 carbon atoms, an aralkyl group having 7 to 20 carbon atoms, an aryl group having 6 to 20 carbon atoms, a heteroaryl group, an alkylthio group having 6 to 20 carbon atoms, and an arylthio group having 6 to 20 carbon atoms, $A_1$ to $A_8$ may form a ring other than an aromatic ring, through a linking group, and M represents two hydrogen atoms, a divalent metal atom, a divalent monosubstituted metal atom, a tetravalent disubstituted metal atom, or an oxy metal atom).

[13] The process for preparing a polymerizable composition for an optical material according to [12], in which, in a tetraazaporphyrin compound represented by Formula (2), M represents a divalent copper atom.

[14] The process for preparing a polymerizable composition for an optical material according to [12] or [13], in which the tetraazaporphyrin compound is represented by Formula (3),

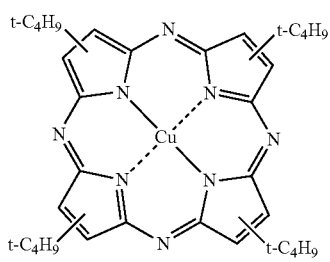

(3)

(in Formula (3), Cu represents divalent copper, t-$C_4H_9$ represents a tertiary-butyl group, and substitution positions of four substituents thereof are any one of $A_1$ and $A_2$, $A_3$ and $A_4$, $A_5$ and $A_6$, and $A_7$ and $A_8$ in Formula (2)).

[15] The process for preparing a polymerizable composition for an optical material according to any one of [10] to [14], in which the UV absorber (D) includes a benzophenone-based compound, a triazine-based compound, and a benzotriazole-based compound.

[16] The process for preparing a polymerizable composition for an optical material according to any one of [10] to [15], in which the polymerization catalyst (D) is an amine compound.

[17] The process for preparing a polymerizable composition for an optical material according to any one of [10] to [16], further including a polythiol compound (E).

[18] A method of manufacturing an optical material, including: a step of heating and curing a polymerizable composition for an optical material obtained by the preparation process according to any one of [10] to [17].

[19] A mixed solution in which an organic coloring matter (B) is dissolved in a polymerization catalyst (D).

Advantageous Effects of Invention

According to the present invention, in a case where a compound including a specific structure including a sulfur atom and a specific UV absorber are combined to be used, it is possible to provide a polymerizable composition that can realize an optical material having an excellent effect of blocking blue light of about 400 to 420 nm from harmful UV rays, having an excellent balance between antiglare characteristics and visibility (contrast performance), being colorless transparent, and having excellent external appearance.

An optical material to which the present invention is applied is colorless and transparent and has excellent external appearance, together with reducing an influence of harmful light on the eyes and suppressing a disorder such as fatigue of the eyes and stress, and thus the optical material can be suitably used as a plastic spectacle lens, specifically.

BRIEF DESCRIPTION OF THE DRAWINGS

The above objects, other objects, features, and advantages become more apparent from the preferable embodiments described below and the accompanying drawings.

FIG. 1 is a spectrum chart obtained in a case where light transmittance is measured with respect to a molded product obtained in a section of Examples.

DESCRIPTION OF EMBODIMENTS

Hereinafter, the present invention is described in detail based on preferable embodiments.

In the present specification, the expression "to" means "equal to or less and equal to or greater than" unless described otherwise.

[Polymerizable Composition for Optical Material]

The polymerizable composition for an optical material of the present embodiment includes an episulfide compound (A), an organic coloring matter (B) exhibiting specific absorption, an UV absorber (C), and a polymerization catalyst (D). Hereinafter, respective components are specifically described.

(Episulfide Compound (A))

The episulfide compound that can be used in the present embodiment can be suitably selected from compounds having two or more episulfide groups in a molecule.

Specific examples of the episulfide compound (A) include a chain aliphatic 2,3-epithiopropylthio compound such as bis(2,3-epithiopropyl) sulfide, bis(2,3-epithiopropyl) disulfide, bis(2,3-epithiopropylthio) methane, 1,2-bis(2,3-epithiopropylthio) ethane, 1,2-bis(2,3-epithiopropylthio) propane, 1,3-bis(2,3-epithiopropylthio) propane, 1,3-bis(2,3-epithiopropylthio)-2-methylpropane, 1,4-bis(2,3-epithiopropylthio) butane, 1,4-bis(2,3-epithiopropylthio)-2-methylbutane, 1,3-bis(2,3-epithiopropylthio) butane, 1,5-bis(2,3-epithiopropylthio) pentane, 1,5-bis(2,3-epithiopropylthio)-2-methylpentane, 1,5-bis(2,3-epithiopropylthio)-3-thiapentane, 1,6-bis(2,3-epithiopropylthio) hexane, 1,6-bis(2,3-epithiopropylthio)-2-methylhexane, 3,8-bis(2,3-epithiopropylthio)-3,6-trithiaoctane, 1,2,3-tris(2,3-epithiopropylthio) propane, 2,2-bis(2,3-epithiopropylthio)-1,3-bis(2,3-epithiopropylthiomethyl) propane, 2,2-bis(2,3-epithiopropylthiomethyl)-1-(2,3-epithiopropylthio) butane, 1,5-bis(2,3-epithiopropylthio)-2-(2,3-epithiopropylthiomethyl)-3-thiapentane, 1,5-bis(2,3-epithiopropylthio)-2,4-bis(2,3-epithiopropylthiomethyl)-3-thiapentane, 1-(2,3-epithiopropylthio)-2,2-bis(2,3-epithiopropylthiomethyl)-4-thiahexane, 1,5,6-tris(2,3-epithiopropylthio)-4-(2,3-epithiopropylthiomethyl)-3-thiahexane, 1,8-bis(2,3-epithiopropylthio)-4-(2,3-epithiopropylthiomethyl)-3,6-dithiaoctane, 1,8-bis(2,3-epithiopropylthio)-4,5-bis(2,3-epithiopropylthiomethyl)-3,6-dithiaoctane, 1,8-bis(2,3-epithiopropylthio)-4,4-bis(2,3-epithiopropylthiomethyl)-3,6-dithiaoctane, 1,8-bis(2,3-epithiopropylthio)-2,5-bis(2,3-epithiopropylthiomethyl)-3,6-dithiaoctane, 1,8-bis(2,3-epithiopropylthio)-2,4,5-tris(2,3-epithiopropylthiomethyl)-3,6-dithiaoctane, 1,1,1-tris[[2-(2,3-epithiopropylthio) ethyl]thiomethyl]-2-(2,3-epithiopropylthio) ethane, 1,1,2,2-tetrakis[[2-(2,3-epithiopropylthio) ethyl] thiomethyl]ethane, 1,11-bis(2,3-epithiopropylthio)-4,8-bis(2,3-epithiopropylthiomethyl)-3,6,9-trithiaundecane, 1,11-bis(2,3-epithiopropylthio)-4,7-bis(2,3-epithiopropylthiomethyl)-3,6,9-trithiaundecane, and 1,11-bis(2,3-epithiopropylthio)-5,7-bis(2,3-epithiopropylthiomethyl)-3,6,9-trithiaundecane;

a cycloaliphatic 2,3-epithiopropylthio compound such as 1,3-bis(2,3-epithiopropylthio) cyclohexane, 1,4-bis(2,3-epithiopropylthio) cyclohexane, 1,3-bis(2,3-epithiopropylthiomethyl) cyclohexane, 1,4-bis(2,3-epithiopropylthiomethyl) cyclohexane, 2,5-bis(2,3-epithiopropylthiomethyl)-1,4-dithiane, 2,5-bis[[2-(2,3-epithiopropylthio) ethyl]thiomethyl]-1,4-dithiane, and 2,5-bis(2,3-epithiopropylthiomethyl)-2,5-dimethyl-1,4-dithiane; and an aromatic 2,3-epithiopropylthio compound such as 1,2-bis(2,3-epithiopropylthio) benzene, 1,3-bis(2,3-epithiopropylthio) benzene, 1,4-bis(2,3-epithiopropylthio) benzene, 1,2-bis(2,3-epithiopropylthiomethyl) benzene, 1,3-bis(2,3-epithiopropylthiomethyl) benzene, 1,4-bis(2,3-epithiopropylthiomethyl) benzene, bis[4-(2,3-epithiopropylthio) phenyl] methane, 2,2-bis[4-(2,3-epithiopropylthio) phenyl] propane, bis[4-(2,3-epithiopropylthio) phenyl] sulfide, bis[4-(2,3-epithiopropylthio) phenyl] sulfone, and 4,4'-bis(2,3-epithiopropylthio) biphenyl, and at least one selected from these can be used.

In view of the effect of the present invention, as the episulfide compound (A), a compound represented by Formula (1), that is, bis(2,3-epithiopropyl) sulfide or bis(2,3-epithiopropyl) disulfide is preferably used.

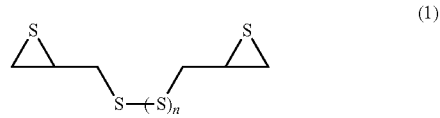

(1)

In Formula (1), n represents 0 or 1.

(Organic Coloring Matter (B))

The organic coloring matter (B) used in the present embodiment is an organic coloring matter exhibiting a specific absorption behavior.

Specifically, the organic coloring matter (B) has a main absorption peak (P) between 565 nm and 605 nm in a visible light absorption spectrum measured with a chloroform or toluene solution of the organic coloring matter (B), an absorption coefficient (ml/g·cm) of a peak apex (Pmax) exhibiting a maximum absorption coefficient of the peak (P) is equal to or greater than $0.5 \times 10^5$, a peak width in an absorbance of ¼ of an absorbance of the peak apex (Pmax) of the peak (P) is equal to or less than 50 nm, a peak width in an absorbance of ½ of the absorbance of the peak apex (Pmax) of the peak (P) is equal to or less than 30 nm, and a peak width in an absorbance of ⅔ of the absorbance of the peak apex (Pmax) of the peak (P) is in a range of equal to or less than 20 nm.

In the present embodiment, a peak apex (Pmax) of the main absorption peak (P) of the organic coloring matter (B) may be between 580 nm and 590 nm. A peak width in an absorbance of ¼ of the absorbance of the peak apex (Pmax) of the main absorption peak (P) may be equal to or less than 40 nm, a peak width in an absorbance of ½ of an absorbance of the peak apex (Pmax) of the main absorption peak (P) may be equal to or less than 25 nm, and a peak width at an absorbance of ⅔ of the absorbance of the peak apex (Pmax) of the main absorption peak (P) may be equal to or less than 20 nm.

It is preferable that the organic coloring matter (B) according to the present embodiment is a tetraazaporphyrone compound represented by Formula (2).

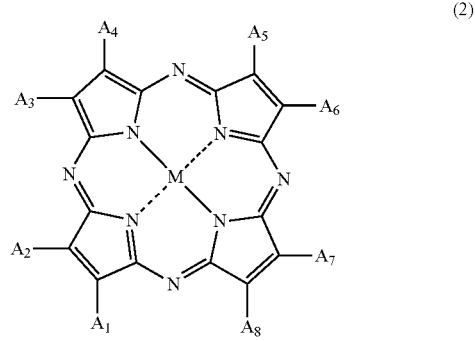

(2)

In Formula (2), $A_1$ to $A_8$ each independently represent a hydrogen atom, a halogen atom, a nitro group, a cyano group, a hydroxy group, an amino group, a carboxyl group, a sulfonic acid group, a linear, branched or cyclic alkyl group having 1 to 20 carbon atoms, an alkoxy group having 1 to 20 carbon atoms, an aryloxy group having 6 to 20 carbon atoms, a monoalkylamino group having 1 to 20 carbon atoms, a dialkylamino group having 2 to 20 carbon atoms, a dialkylamino group having 7 to 20 carbon atoms, an aralkyl group having 7 to 20 carbon atoms, an aryl group having 6 to 20 carbon atoms, a heteroaryl group, an alkylthio group having 6 to 20 carbon atoms, and an arylthio group having 6 to 20 carbon atoms, $A_1$ to $A_8$ may form a ring other than an aromatic ring, through a linking group, and M represents two hydrogen atoms, a divalent metal atom, a divalent monosubstituted metal atom, a tetravalent disubstituted metal atom, or an oxy metal atom.

According to the present embodiment, at least one selected from these can be used as the organic coloring matter (B).

With respect to the tetraazaporphyrin compound represented by Formula (2), M in Formula (2) is more preferably divalent copper. Specific examples include a tetra-t-butyl-tetraazaporphyrin copper complex represented by Formula (3), and this corresponds to a model name of PD-311S (manufactured by Mitsui Chemicals, Inc.).

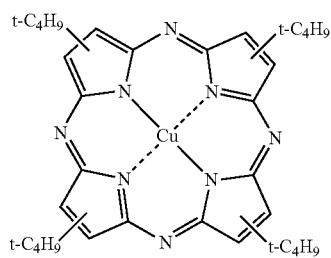

(3)

In Formula (3), Cu represents divalent copper, t-$C_4H_9$ represents a tertiary-butyl group, and substitution positions of four substituents thereof are either of $A_1$ or $A_2$, either of $A_3$ or $A_4$, either of $A_5$ or $A_6$, and either of $A_7$ or $A_8$ in Formula (2).

(UV Absorber (C))

The UV absorber (C) used in the present embodiment may be appropriately selected from the known UV absorber, but, for example, an absorbing agent having a maximum absorption wavelength of 340 nm to 360 nm in a case of being dissolved in a chloroform solution is preferable.

Specifically, examples of the UV absorber (C) include a benzophenone-based compound, a triazine-based compound, and a benzotriazole-based compound.

Examples of the benzophenone-based compound include 2,2'-dihydroxy-4,4'-dimethoxybenzophenone, and 2,2'-4,4'-tetrahydroxybenzophenone.

Examples of the triazine compound include ADEKASTAB LA-F70 manufactured by ADEKA Corporation and TINUVIN 400 manufactured by BASF SE.

In the present embodiment, it is preferable to use a benzotriazole-based compound, and examples of the benzotriazole-based compound include an alkyl-substituted benzotriazole-based compound, a linear alkylester-substituted benzotriazole-based compound, and a chloro-substituted benzotriazole-based compound.

Examples of the alkyl-substituted benzotriazole-based compound include 2-(2H-benzotriazole-2-yl)-4-tert-octylphenol, and examples of commercially available products include Viosorb 583 manufactured by Kyodo Chemical Co., Ltd. and SEESEORB 709 manufactured by Shipro Kasei Kaisha, Ltd.

Examples of the linear alkyl ester-substituted benzotriazole-based compound include a mixture of octyl 3-[3-tert-butyl-5-(5-chloro-2H-benzotriazole-2-yl)-4-hydroxyphenyl] propionate and 2-ethylhexyl 3-[3-tert-butyl-5-(5-chloro-2H-benzotriazole-2-yl)-4-hydroxyphenyl] propionate, and examples of commercially available products include EVERSORB 109 manufactured by Everlight Chemical Industrial Corp.

Examples of a chlorosubstituted benzotriazole compound include 2-(2-hydroxy-3-t-butyl-5-methylphenyl)-chlorobenzotriazole, and examples of commercially available products include TINUVIN 326 manufactured by BASF SE, SEESEORB 703 manufactured by Shipro Kasei Kaisha, Ltd., Viosorb 550 manufactured by Kyodo Chemical Co., Ltd., and KEMISORB 73 manufactured by Chemipro Kasei Kaisha, Ltd. In a case where the UV absorber (D) is a compound having a maximum absorption wavelength in a case of being dissolved in a chloroform solution is 340 nm to 360 nm, it is possible to effectively obtain an optical material having an excellent effect of blocking blue light of about 400 to 420 nm from harmful UV rays, being colorless and transparent, and having an excellent external appearance.

According to the present embodiment, it is preferable to use one or more of these UV absorbers as the UV absorber (C), and two or more different kinds of the UV absorbers (C) may be contained. It is preferable that the maximum absorption peaks of all of the UV absorbers forming the UV absorber (C) are also in the range of 340 nm to 360 nm.

(Polymerization Catalyst (D))

According to the present embodiment, examples of the polymerization catalyst (D) include Lewis acid, an amine compound, organic acid, amine organic acid salt, and Lewis acid, an amine compound, and amine organic acid salt are preferable, and an amine compound is more preferable.

These compounds may be suitably selected from the known polymerization catalysts.

According to the present embodiment, as the polymerization catalyst (D), a compound that dissolves the organic coloring matter (B) is used. In view of the above, the polymerization catalyst (D) in the present embodiment is preferably liquid at room temperature or in a case of being heated.

In view of process efficiency, the polymerization catalyst (D) which is liquid at room temperature is more preferably used.

In the present embodiment, as the polymerization catalyst (D), an amine compound is preferably used. Examples of the amine compound include tertiary amines such as triethylamine, tri-n-propylamine, triisopropylamine, tri-n-butylamine, triisobutylamine, N,N-dimethylbenzylamine, N-methyl morpholine, N,N-dimethylcyclohexylamine, N,N-dicyclohexylmethylamine, dimethyl dipropylene triamine, pentamethyldiethylenetriamine, bis (2-dimethylaminoethyl) ether, N-methyl morpholine, N,N'-dimethylpiperazine, triethylenediamine, N,N,N',N'-tetramethylethylenediamine, and bicyclooctanediamine (DABCO);

quaternary ammonium salts such as tetramethyl ammonium bromide, tetraethylammonium bromide, tetrapropylammonium bromide, tetrabutylammonium bromide, tetrahexylammonium bromide, and tetraethylammonium hydroxide;

imidazoles such as imidazole, 1,2-dimethylimidazole, benzyl methyl imidazole, and 2-ethyl-4-imidazole;

pyrazoles such as pyrazole and 3,5-dimethylpyrazole; and hindered amines such as 1,2,2,6,6-pentamethyl-4-piperidinol, 1,2,2,6,6-pentamethyl-4-hydroxyethyl-4-piperidinol, methyl-1,2,2,6,6-pentamethyl-4-piperidyl sebacate, a mixture of methyl-1,2,2,6,6-pentamethyl-4-piperidyl sebacate and bis(1,2,2,6,6-pentamethyl-4-piperidyl) sebacate, bis(1,2,2,6,6-pentamethyl-4-piperidyl) sebacate, bis(2,2,6,6-tetramethyl-1-(octyloxy)-4-piperidyl) sebacate, bis(1,2,2,6,6-pentamethyl-4-piperidyl) [[3,5-bis(1,1-dimethylethyl)-4-hydroxyphenyl] methyl] butyl malonate, and tetrakis(1,2,2,6,6-pentamethyl-4-piperidyl) butane-1,2,3,4-tetracarboxylate. According to the present embodiment, at least one selected from these can be used as the polymerization catalyst (D).

According to the present embodiment, in view of the effect of the present invention, N, N-dicyclohexylmethylamine and N, N-dimethylcyclohexylamine are preferably used.

Examples thereof also include polymerization catalysts of phosphines such as trimethylphosphine, triethylphosphine, tri-n-propylphosphine, triisopropylphosphine, tri-n-butylphosphine, triphenylphosphine, tribenzylphosphine, 1,2-bis(diphenylphosphino) ethane, and 1,2-bis(dimethylphosphino) ethane, Lewis acid such as dimethyl tin dichloride, dibutyltin dichloride, dibutyltin dilaurate, tetrachlorotin, dibutyltin oxide, zinc chloride, acetylacetone zinc, aluminum chloride, aluminum fluoride, triphenylaluminum, tetrachlorotitanium, and calcium acetate, and acid anhydrides such as diphenyliodonium hexafluorophosphate, diphenyliodonium hexafluoroarsenic acid, diphenyliodonium hexafluoroantimonate, triphenylsulfonium tetrafluoroboric acid, triphenylsulfonium hexafluorophosphate, triphenylsulfonium hexafluoroarsenic acid, and acetic anhydride, but the present invention is not limited to these exemplified compounds.

(Polythiol Compound (E))

The polythiol compound (E) may be further included in the polymerizable composition for an optical material according to the present embodiment. The polythiol compound (E) according to the present embodiment means a compound having two or more mercapto groups (thiol groups) in a molecule.

Examples of the polythiol compound (E) include an aliphatic polythiol compound such as methanedithiol, 1,2-ethanedithiol, 1,2,3-propanetrithiol, 1,2-cyclohexanedithiol, bis(2-mercaptoethyl) ether, tetrakis(mercaptomethyl) methane, diethylene glycol bis(2-mercaptoacetate), diethylene glycol bis(3-mercaptopropionate), ethylene glycol bis(2-mercaptoacetate), ethylene glycol bis(3-mercaptopropionate), trimethylolpropane tris(2-mercaptoacetate), trimethylolpropane tris(3-mercaptopropionate), trimethylol ethane tris(2-mercaptoacetate), trimethylol ethane tris(3-mercaptopropionate), pentaerythritol tetrakis(2-mercaptoacetate), pentaerythritol tetrakis(3-mercaptopropionate), bis(mercaptomethyl) sulfide, bis(mercaptomethyl) disulfide, bis(2-mercaptoethyl) sulfide, bis(2-mercaptoethyl) disulfide, bis(mercaptopropyl) sulfide, bis(mercaptomethylthio) methane, bis(2-mercaptoethylthio) methane, bis(3-mercaptopropylthio) methane, 1,2-bis(mercaptomethylthio) ethane, 1,2-bis(2-mercaptoethylthio) ethane, 1,2-bis(3-mercaptopropylthio) ethane, 1,2,3-tris(mercaptomethylthio) propane, 1,2,3-tris(2-mercaptoethylthio) propane, 1,2,3-tris(3-mercaptopropylthio) propane, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, tetrakis(mercaptomethylthiomethyl) methane, tetrakis(2-mercaptoethylthiomethyl) methane, tetrakis(3-mercaptopropylthiomethyl) methane, bis(2,3-dimercaptopropyl) sulfide, 2,5-dimercaptomethyl-1,4-dithiane, 2,5-dimercapto-1,4-dithiane, 2,5-dimercaptomethyl-2,5-dimethyl-1,4-dithiane, an ester thereof with thioglycolic acid and mercaptopropionic acid, hydroxymethyl sulfide bis(2-mercaptoacetate), hydroxymethyl sulfide bis(3-mercaptopropionate), hydroxyethyl sulfide bis(2-mercaptoacetate), hydroxyethyl sulfide bis(3-mercaptopropionate), hydroxymethyl disulfide bis(2-mercaptoacetate), hydroxymethyl disulfide bis(3-mercaptopropionate), hydroxyethyl disulfide bis(2-mercaptoacetate), hydroxyethyl disulfide bis(3-mercaptopropinate), 2-mercaptoethyl ether bis(2-mercaptoacetate), 2-mercaptoethyl ether bis(3-mercaptopropionate), thiodiglycolic acid bis(2-mercaptoethyl ester), thiodipropionic acid bis(2-mercaptoethyl ester), dithiodiglycolic acid bis(2-mercaptoethyl ester), dithiodipropionic acid bis(2-mercaptoethyl ester), 1,1,3,3-tetrakis(mercaptomethylthio) propane, 1,1,2,2-tetrakis(mercaptomethylthio) ethane, 4,6-bis(mercaptomethylthio)-1,3-dithiane, tris(mercaptomethylthio) methane, and tris(mercaptoethylthio) methane;

an aromatic polythiol compound such as 1,2-dimercaptobenzene, 1,3-dimercaptobenzene, 1,4-dimercaptobenzene, 1,2-bis(mercaptomethyl) benzene, 1,3-bis(mercaptomethyl) benzene, 1,4-bis(mercaptomethyl) benzene, 1,2-bis(mercaptoethyl) benzene, 1,3-bis(mercaptoethyl) benzene, 1,4-bis (mercaptoethyl) benzene, 1,3,5-trimercaptobenzene, 1,3,5-tris(mercaptomethyl) benzene, 1,3,5-tris (mercaptomethyleneoxy) benzene, 1,3,5-tris (mercaptoethyleneoxy) benzene, 2,5-toluenedithiol, 3,4-toluenedithiol, 1,5-naphthalene dithiol, and 2,6-naphthalenedithiol; and a heterocyclic polythiol compound such as 2-methylamino-4,6-dithiol-sym-triazine, 3,4-thiophenedithiol, bismuthiol, 4,6-bis(mercaptomethylthio)-1,3-dithiane, and 2-(2,2-bis(mercaptomethylthio)ethyl)-1,3-dithietane.

According to the present embodiment, as the polythiol compound (E), it is preferable to use at least one selected from pentaerythritol tetrakis(2-mercaptoacetate), pentaerythritol tetrakis(3-mercaptopropionate), bis(2-mercaptoethyl) sulfide, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,1-dimercapto-3,6,9-trithiaundecane, 2,5-dimercaptomethyl-1,4-dithiane, 1,1,3,3-tetrakis(mercaptomethylthio) propane, 4,6-bis(mercaptomethylthio)-1,3-dithiane, 2-(2,2-bis(mercaptomethylthio) ethyl)-1,3-dithietane, and ethylene glycol bis(3-mercaptopropionate), and it is more preferable to use at least one selected from 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane.

(Poly(Thio)Isocyanate Compound (F))

A poly(thio)isocyanate compound (F) may be further included in the polymerizable composition for an optical material according to the present embodiment. The poly(thio)isocyanate compound (F) according to the present embodiment means a compound having two or more (thio) isocyanate groups in a molecule.

Examples of the polyisocyanate compound include an aliphatic polyisocyanate compound such as pentamethylene diisocyanate, hexamethylene diisocyanate, 2,2,4-trimethylhexane diisocyanate, 2,4,4-trimethylhexamethylene diisocyanate, lysine diisocyanatomethyl ester, lysine triisocyanate, m-xylylene diisocyanate, p-xylene diisocyanate, α,α,α',α'-tetramethylxylylene diisocyanate, bis(isocyanatomethyl) naphthalene, 1,3,5-tris(isocyanatomethyl) benzene, bis(isocyanatomethyl) sulfide, bis(isocyanatoethyl) sulfide, bis(isocyanatomethyl) disulfide, bis(isocyanatoethyl) disulfide, bis(isocyanatomethylthio) methane, bis(isocyanatoethylthio) methane, bis(isocyanatoethylthio) ethane, and bis(isocyanatomethylthio) ethane;

an alicyclic polyisocyanate compound such as isophorone diisocyanate, bis(isocyanatomethyl) cyclohexane, dicyclohexylmethane-4,4'-diisocyanate, cyclohexane diisocyanate, methyl cyclohexane diisocyanate, dicyclohexyl dimethyl methane isocyanate, 2,5-bis(isocyanatomethyl) bicyclo-[2.2.1]-heptane, 2,6-bis(isocyanatomethyl) bicyclo-[2.2.1]-heptane, 3,8-bis(isocyanatomethyl) tricyclodecane, 3,9-bis(isocyanatomethyl) tricyclodecane, 4,8-bis(isocyanatomethyl) tricyclodecane, and 4,9-bis(isocyanatomethyl) tricyclodecane;

an aromatic polyisocyanate compound such as 1,3-phenylene diisocyanate, 1,4-phenylene diisocyanate, 2,4-tolylene diisocyanate, 2,6-tolylene diisocyanate, 4,4'-diphenylmethane diisocyanate, and diphenylsulfide-4,4-diisocyanate; and a heterocyclic polyisocyanate compound such as 2,5-diisocyanatothiophene, 2,5-bis(isocyanatomethyl) thiophene, 2,5-diisocyanatotetrahydrothiophene, 2,5-bis(isocyanatomethyl) tetrahydrothiophene, 3,4-bis(isocyanatomethyl) tetrahydrothiophene, 2,5-diisocyanato-1,4-dithiane, 2,5-bis(isocyanatomethyl)-1,4-dithiane, 4,5-diisocyanato-1,3-dithiolane, and 4,5-bis(isocyanatomethyl)-1,3-dithiolane.

A halogen substituted compound such as a bromine substitute and a chlorine substitute of these, an alkyl substitute, an alkoxy substitute, a nitro substitute, a prepolymer type modified product with polyhydric alcohol, a carbodiimide modified product, a urea modified product, a burette modified product, a dimerization or trimerization reaction product, and the like can be used.

Examples of the isothiocyanate compound include an aliphatic polyisothiocyanate compound such as hexamethylene diisothiocyanate, lysine diisothiocyanate methyl ester, lysine triisothiocyanate, m-xylylene diisothiocyanate, bis(isothiocyanatomethyl) sulfide, bis(isothiocyanatoethyl) sulfide, and bis(isothiocyanatoethyl) disulfide;

an alicyclic polyisothiocyanate compound such as isophorone diisothiocyanate, bis(isothiocyanatomethyl) cyclohexane, dicyclohexylmethane diisothiocyanate, cyclohexane diisothiocyanate, methyl cyclohexane diisothiocyanate, 2,5-bis(isothiocyanatomethyl) bicyclo-[2.2.1]-heptane, 2,6-bis(isothiocyanatomethyl) bicyclo-[2.2.1]-heptane, 3,8-bis(isothiocyanatomethyl) tricyclodecane, 3,9-bis(isothiocyanatomethyl) tricyclodecane, 4,8-bis(isothiocyanatomethyl) tricyclodecane, and 4,9-bis(isothiocyanatomethyl) tricyclodecane;

an aromatic polyisothiocyanate compound such as tolylene diisothiocyanate, 4,4-diphenylmethane diisothiocyanate, and diphenyl disulfide-4,4-diisothiocyanate; and a sulfur-containing heterocyclic polyisothiocyanate compound such as 2,5-diisothiocyanatothiophene, 2,5-bis(isothiocyanatomethyl) thiophene, 2,5-isothiocyanatotetrahydrothiophene, 2,5-bis(isothiocyanatomethyl) tetrahydrothiophene, 3,4-bis(isothiocyanatomethyl) tetrahydrothiophene, 2,5-diisothiocyanato-1,4-dithiane, 2,5-bis(isothiocyanatomethyl)-1,4-dithiane, 4,5-diisothiocyanato-1,3-dithiolane, and 4,5-bis(isothiocyanatomethyl)-1,3-dithiolane.

A halogen substituted compound such as a bromine substitute and a chlorine substitute of these, an alkyl substitute, an alkoxy substitute, a nitro substitute, a prepolymer type modified product with polyhydric alcohol, a carbodiimide modified product, a urea modified product, a burette modified product, a dimerization or trimerization reaction product, and the like can be used.

The polymerizable composition for an optical material according to the present embodiment may further include an internal release agent, a resin modifier, a light stabilizer, a bluing agent, and the like, as other components.

In view of improving the crosslinking performance, the polymerizable composition for an optical material of the present embodiment may include sulfur.

(Internal Release Agent)

As the internal release agent, an acidic phosphate ester can be used. Examples of the acidic phosphate ester include phosphoric acid monoester and phosphoric acid diester, and these may be used singly or two or more types thereof may be used in a mixture.

For example, ZelecUN manufactured by Stepan Company, an internal release agent for MR manufactured by Mitsui Chemicals, Inc., JP series manufactured by Johoku Chemical Co., Ltd., PHOSPHANOL series manufactured by Toho Chemical Industry Co., Ltd., and AP, DP Series manufactured by Daihachi Chemical Industry Co., Ltd. can be used.

(Resin Modifier)

A resin modifier may be added to the polymerizable composition for an optical material of the present embodiment, for the purpose of adjustment of various physical properties such as optical properties, impact resistance, specific gravity of the obtainable resin, and adjustment of viscosity and a pot life of the composition, without deteriorating the effect of the present invention.

Examples of the resin modifier include an alcohol compound, an epoxy compound, an organic acid and an anhydride thereof, and an olefin compound including a (meth)acrylate compound and the like.

(Light Stabilizer)

As the light stabilizer, for example, a hindered amine-based compound can be used. Examples of the commercially available products of the hindered amine-based compound include Lowilite76 and Lowilite92 manufactured by Chemtura Corporation, Tinuvin144, Tinuvin292, and Tinuvin765 manufactured by BASF SE, ADEKASTAB LA-52 and LA-72 manufactured by ADEKA Corporation, and JF-95 manufactured by Johoku Chemical Co., Ltd.

(Blueing Agent)

Examples of the bluing agent include a bluing agent having an absorption band in orange to yellow wavelength ranges in the visible light region and having a function of adjusting the hue of the optical material made of a resin. Specifically, the bluing agent includes a material exhibiting blue to purple colors.

Subsequently, the composition of the polymerizable composition for an optical material of the present embodiment will be described.

According to the present embodiment, in view of sufficiently exhibiting the effect of the corresponding component, the content of the organic coloring matter (B), for example, is 0.0001 to 0.1 parts by weight (pbw), preferably 0.0002 to 0.01 pbw, and more preferably 0.0005 to 0.005 pbw with respect to 100 pbw of the polymerizable composition for an optical material.

According to the present embodiment, in view of sufficiently exhibiting the effect of the corresponding component, the content of the UV absorber (C), for example, is 0.1 to 1.0 pbw, preferably 0.2 to 0.8 pbw, and more preferably 0.3 to 0.6 pbw with respect to 100 pbw of the polymerizable composition for an optical material.

Since amounts of other additive components in the present embodiment are generally small amounts, 100 pbw of the polymerizable composition for an optical material may be "100 pbw of the sum of the episulfide compound (A), the organic coloring matter (B), the UV absorber (C), and the polymerization catalyst (D)", "100 pbw of the sum of the episulfide compound (A), the organic coloring matter (B), the UV absorber (C), the polymerization catalyst (D), and the polythiol compound (E) which is added, if necessary" or "100 pbw of the sum of the episulfide compound (A), the organic coloring matter (B), the UV absorber (C), the polymerization catalyst (D), and the poly(thio)isocyanate compound (F), which added, if necessary", or "100 pbw of the sum of the episulfide compound (A), the organic coloring matter (B), the UV absorber (C), and the polymerization catalyst (D), and the polythiol compound (E) and the poly(thio)isocyanate compound (F) which are added, if necessary".

[Process for Preparing Polymerizable Composition for Optical Material]

The polymerizable composition for an optical material of the present embodiment can be obtained by mixing the components by a predetermined method.

A mixing order or a mixing method of the respective components in the composition is not limited, as long as the respective components can be evenly mixed, and the mixing can be performed in the known method. Examples of the known method include a method of preparing a master batch containing a predetermined amount of an additive and dispersing or dissolving the master batch in a solvent.

According to the present embodiment, it is preferable that a polymerizable composition for an optical material can be obtained by Steps 1 and Step 2.

Step 1: Dissolving the organic coloring matter (B) in the polymerization catalyst (D) so as to obtain a mixed solution.

Step 2: Formulating the episulfide compound (A), the UV absorber (C), and the mixed solution so as to obtain the polymerizable composition for an optical material.

Here, the present inventors have found that the polymerization catalyst (D), specifically, an amine compound has high compatibility with the organic coloring matter (B). That is, in a case where a mixed solution is prepared by mixing these, the organic coloring matter (B) can be evenly dispersed in the obtained resin. That is, in a case where the other component was mixed to the mixed solution by using the mixed solution of the present embodiment, the polymerizable composition for an optical material in which the organic coloring matter (B) is evenly dispersed can be obtained, and as a result, it is possible to obtain an optical material in which the organic coloring matter (B) is evenly dispersed. In this manner, it is possible to suitably obtain an optical material having an excellent effect of blocking UV rays or blue light, being colorless transparent, and having excellent external appearance by using the mixed solution of the present embodiment.

As the polymerization catalyst (D), N,N-dicyclohexylmethylamine or N,N-dimethylcyclohexylamine is preferable, and as the organic coloring matter (B), a combination with a tetra-t-butyl-tetraazaporphyrin and copper complex represented by Formula (3) is preferable.

In Step 1, the organic coloring matter (B) may be included in an amount of being 0.01 to 5.0 pbw and preferably 0.5 to 3.0 pbw with respect to 100 pbw of the sum of the polymerization catalyst (D).

The mixing temperature in Step 1 can be 5° C. to 40° C. and preferably 10° C. to 30° C. The addition order and the addition rate are not limited as long as the respective components can be uniformly mixed. In view of the above, the mixing time can be set as 5 to 120 minutes and preferably as 30 to 60 minutes. The pressure condition in a case of mixing is not limited, and the mixing may be performed under normal pressure or under pressure.

The mixed solution (coloring matter solution) obtained in this manner can be easily handled and the productivity of the optical material is improved.

Thereafter, the episulfide compound (A), the UV absorber (C), and the mixed solution can be formulated in Step 2 so as to obtain the polymerizable composition for an optical material. In Step 2, the polythiol compound (E), the poly(thio)isocyanate compound (F), and various additives may be added.

Independently from the polymerization catalyst (D) included in the above mixed solution, the polymerization catalyst (D) may be separately added in Step 2.

The mixing temperature and the mixing time in Step 2 can be arbitrarily set. The same condition as in Step 1 may be employed.

[Optical Material]

Subsequently, an optical material according to the present embodiment is described.

An optical material according to the present embodiment can be obtained by curing (for example, heat curing) the polymerizable composition for an optical material and causing the polymerizable composition to be a cured product.

The optical material according to the present embodiment can be obtained, for example, by cast polymerizing the polymerizable composition for an optical material.

Specifically, the polymerizable composition for an optical material is injected into a cavity of a molding mold held by a gasket, a tape or the like. In this case, depending on the physical properties required for the plastic lens to be obtained, a defoaming treatment under reduced pressure, and a filtration treatment under pressurization, under reduced pressure, or the like is preferably performed, if necessary.

After the composition is injected, the mold for casting a lens is cured and molded by heating in a predetermined temperature program in an oven or a heatable device such as in water. The obtained molded product may be subjected to a treatment such as annealing, if necessary.

In the molded product (100 pbw) of the present embodiment, the UV absorber (C) can be included by 0.1 to 0.8 pbw, preferably by 0.2 to 0.6 pbw, and more preferably by 0.3 to 0.5 pbw. Accordingly, it is possible to suitably provide an optical material having an excellent effect of blocking blue light of 400 to 420 nm from harmful UV rays, being colorless transparent, and having excellent external appearance.

The molded product of the present embodiment can be used as various optical materials, by having a desired shape and having a coating layer or other members formed, if necessary.

In an optical material obtained from the polymerizable composition for an optical material of the present embodiment, transparency is excellent, coloration is suppressed, and further a disorder such as fatigue of the eyes or stress can be suppressed. Specifically, in a case where light transmittance at 440 nm is equal to or greater than 80%, an optical material being colorless and transparent and having excellent external appearance can be obtained.

[Use of Optical Material]

Subsequently, the use of the optical material of the present embodiment will be described.

The optical material of the present embodiment can be obtained from the polymerizable composition including the specific composition, cuts light in a wavelength of 400 nm to 420 nm, has high transparency, and has an excellent physical balance.

Examples of the optical material according to the present embodiment include various plastic lenses such as a plastic spectacle lens, goggles, a spectacle lens for vision correction, a lens for an imaging device, a Fresnel screen for a liquid crystal projector, a lenticular lens, and a contact lens, an antireflection film used for a sealing material for a light emitting diode (LED), an optical waveguide, an optical adhesive used for bonding an optical lens and an optical waveguide, an optical lens, or the like, transparent coating used for a liquid crystal display device member (a substrate, a light guide plate, a film, a sheet, or the like), a sheet and a film to be attached to a car windshield and a motorcycle helmet, or a transparent substrate.

With respect to the optical material according to the present embodiment, in a thickness of 2 mm, a light transmittance in a wavelength of 440 nm is equal to or greater than 80% and preferably equal to or greater than 83%, a light transmittance in 590 nm is equal to or less than 70% and preferably equal to or less than 50%, and a light transmittance in 410 nm is equal to or less than 10% and preferably equal to or less than 5%. In a case where the light transmittance is in the above range, the optical material has an excellent effect of blocking blue light in about 420 nm from harmful UV rays, being colorless and transparent, and having excellent external appearance. Also, an optical material being colorless and transparent and having excellent external appearance can be obtained by causing light transmittance at 440 nm to be equal to or greater than 80%. The numerical range can be arbitrarily combined.

[Plastic Spectacle Lens]

A plastic spectacle lens can be obtained by using the optical material of the present embodiment. A coating layer on one surface or both surfaces thereof may be provided to be used, if necessary.

Specific examples of the coating layer include a primer layer, a hard coat layer, an antireflection layer, an anti-fog coating layer, an antifouling layer, and a water repellent layer. These coating layers may be used singly or a plurality of coating layers may be used in multilayers. In a case where coating layers are provided on the both surfaces, the same coating layer may be provided on each surface, or different coating layer may be provided on each surface.

In each of these coating layers, known UV absorbers in addition to the UV absorber (C), an infrared absorbing agent for the purpose of protecting eyes from infrared rays, a light stabilizer and an antioxidant for the purpose of improving the weather fastness of the lens, a dye, a pigment, a photochromic dye, and a photochromic pigment, for the purpose of improving the fashionability of the lens, an antistatic agent, and other known additives for enhancing the performance of the lens may be used in combination. With respect to the layer to be coated by application, various leveling agents for improving applicability may be used.

In the above, the embodiments of the present invention are described, but the present invention is not limited to the embodiments described above, but various aspects can be applied without deteriorating from the effect of the present invention.

EXAMPLES

Hereinafter, the present invention is specifically described with reference to the examples, but the present invention is not limited thereto. The evaluation method used in the examples of the present invention is as below.

<Evaluation Method>

Light Transmittance

As a measuring device, a UV-visible light spectrum (380 to 800 nm) was measured using Shimadzu spectrophotometer UV-1600 manufactured by Shimadzu Corporation and using a 2-mm thick plano lens.

Solubility Test

The prepared mixed solution (master batch) was heated from 20° C. to 40° C. and mixed and stirred, and properties such as viscosity were checked after a predetermined period of time. A case where the properties were changed was presented as x, and a case where the properties were not changed was presented as ○. After a predetermined period of time, a portion was extracted and filtration was performed through a 1 μm PTFE filter, and then a portion on the filter was checked. A case where a compound remained on the filter was presented as x, and a case where a compound did not remain on the filter was presented as ○. In both of the above two checking methods, a case in which both were ○ was evaluated as ○, and any one or both were x was evaluated as x.

Preparation Example 1

1.0 pbw of a tetra-t-butyl-tetraazaporphyrin copper complex (trade name: PD-311S manufactured by Mitsui Chemicals, Inc.) represented by Formula (3) which was an organic coloring matter was added to 100 pbw of N,N-dicyclohexylmethylamine, and stirring was performed at 40° C. for five hs, so as to prepare the mixed solution (1).

Independently from the mixed solution (1), PD-311S was dissolved in N,N-dicyclohexylmethylamine in each amount ratio represented by Table 1, so as to perform the above solubility test. The results were as presented in Table 1.

Preparation Examples 2 to 4

Various mixed solutions were obtained in the same manner as Preparation Example 1 except for changing N,N-dicyclohexylmethylamine to each compound. With respect to the various mixed solutions prepared, solubility tests were performed. Results thereof are as presented in Table 1.

The reference numerals presented in Table 1 correspond to the compound provided below.

D-1: N,N-dicyclohexylmethylamine

D-2: N,N-dimethylcyclohexylamine

E-1: Polythiol compound having 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane, as main components A-1: bis(2,3-epithiopropyl) disulfide

TABLE 1

|  |  | 100 ppm | 5,000 ppm | 10,000 ppm | 15,000 ppm |
|---|---|---|---|---|---|
| Preparation Example 1 | D-1 | o/1 hr | o/3 hr | o/3 hr | o/5 hr |
| Preparation Example 2 | D-2 | o/1 hr | o/3 hr | o/3 hr | o/5 hr |
| Preparation Example 3 | E-1 | x/12 hr | — | — | — |
| Preparation Example 4 | A-1 | x/12 hr | — | — | — |

Example 1

0.064 pbw of the mixed solution (1) prepared in Preparation Example 1 and 0.013 pbw of N,N-dimethylcyclohexylamine were mixed and dissolved in 6.4 pbw of a polythiol compound having 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane as main components, so as to obtain a composition (a).

0.28 pbw of 2-(2-hydroxy-3-t-butyl-5-methylphenyl)-chlorobenzotriazole (TINUVIN 326 manufactured by BASF SE: maximum absorption wavelength 352 nm) and 63.6 pbw of bis(2,3-epithiopropyl) disulfide were stirred at 20° C. for one h to obtain a homogeneous solution. The composition (a) was added to this homogeneous solution and stirred at 20° C., so as to obtain the composition (b).

This composition (b) was defoamed for one h at 600 Pa, filtrated with a 1 μm PTFE filter, and then injected into a molding mold. The molding mold was put into a polymerization oven, and heated from 30° C. to 80° C. over 19 hs for polymerization. After polymerization, the mold was taken out from the oven, cooled down, and releasing from the molding mold was performed, so as to obtain a molded product having a thickness of 2 mm. The obtained molded product was subjected to an annealing treatment at 120° C. for three hs.

As a result of measuring the light transmittance of this molded product subjected to the annealing treatment, the light transmittance at a wavelength of 440 nm was 83.6%, the light transmittance at 420 nm was 15.7%, the light transmittance at 410 nm was 0.1%, and the light transmittance at 590 nm was 26.6%. A spectrum chart obtained in Example 1 is illustrated in FIG. 1.

Comparative Example 1

A molded product was obtained in the same manner as in Example 1 except for changing the mixed solution (1) to N,N-dicyclohexylmethylamine and changing 0.28 parts by weight (pbw) of 2-(2-hydroxy-3-t-butyl-5-methylphenyl)-chlorobenzotriazole (TINUVIN 326 manufactured by BASF SE, having a maximum absorption wavelength of 352 nm) to 0.7 pbw of 2-(2-hydroxy-5-t-butylphenyl)-2H-benzotriazole (TINUVIN PS: manufactured by BASF SE, having a maximum absorption wavelength of 342 nm).

As a result of measuring the light transmittance of this molded product subjected to the annealing treatment, the light transmittance at a wavelength of 440 nm was 84.0%, the light transmittance at 420 nm was 76.9%, the light transmittance at 410 nm was 52.8%, and the light transmittance at 590 nm was 84.9%. A spectrum chart obtained in Comparative Example 1 is illustrated in FIG. 1.

This application claims priority based on Japanese Patent Application No. 2015-183427 filed on Sep. 16, 2015, and the disclosure of which is incorporated herein in its entirety.

The invention claimed is:

1. A polymerizable composition for an optical material, comprising:
    an episulfide compound (A);
    an organic coloring matter (B);
    an UV absorber (C); and
    a polymerization catalyst (D), wherein the organic coloring matter (B) has a main absorption peak (P) between 565 nm and 605 nm in a visible light absorption spectrum measured with a chloroform or toluene solution of the organic coloring matter (B), an absorption coefficient (ml/g·cm) of a peak apex (Pmax) exhibiting a maximum absorption coefficient of the peak (P) is equal to or greater than $0.5 \times 10^5$, a peak width in an absorbance of ¼ of an absorbance of the peak apex (Pmax) of the peak (P) is equal to or less than 50 nm, a peak width in an absorbance of ½ of the absorbance of the peak apex (Pmax) of the peak (P) is equal to or less than 30 nm, and a peak width in an absorbance of ⅔ of the absorbance of the peak apex (Pmax) of the peak (P) is in a range of equal to or less than 20 nm,
    wherein the organic coloring matter (B) is a tetraazaporphyrin compound represented by Formula (2),

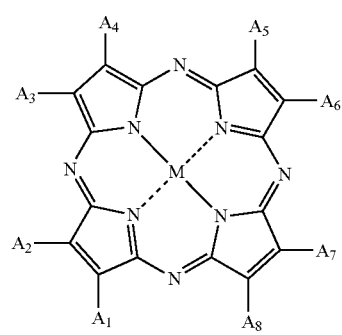

(2)

in Formula (2), $A_1$ to $A_8$ each independently represent a hydrogen atom, a halogen atom, a nitro group, a cyano group, a hydroxy group, an amino group, a carboxyl group, a sulfonic acid group, a linear, branched or cyclic alkyl group having 1 to 20 carbon atoms, an alkoxy group having 1 to 20 carbon atoms, an aryloxy group having 6 to 20 carbon atoms, a monoalkylamino group having 1 to 20 carbon atoms, a dialkylamino group having 2 to 20 carbon atoms, a dialkylamino group having 7 to 20 carbon atoms, an aralkyl group having 7 to 20 carbon atoms, an aryl group having 6 to 20 carbon atoms, a heteroaryl group, an alkylthio group having 6 to 20 carbon atoms, and an arylthio group having 6 to 20 carbon atoms, $A_1$ to $A_8$ may form a ring other than an aromatic ring, through a linking group, and M represents two hydrogen atoms, a divalent metal atom, a divalent monosubstituted metal atom, a tetravalent disubstituted metal atom, or an oxy metal atom, and
wherein the polymerization catalyst (D) is an amine compound.

2. The polymerizable composition for an optical material according to claim 1, wherein the episulfide compound (A) is a compound represented by Formula (1),

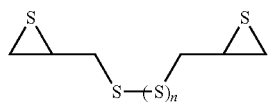

(1)

in Formula (1), n represents 0 or 1.

3. The polymerizable composition for an optical material according to claim 1,
wherein, in a tetraazaporphyrin compound represented by Formula (2), M represents a divalent copper atom.

4. The polymerizable composition for an optical material according to claim 1,
wherein the tetraazaporphyrin compound is represented by Formula (3),

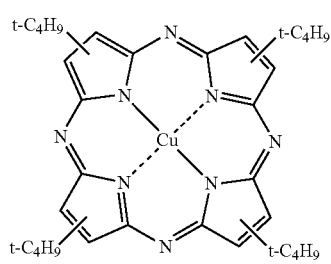

(3)

in Formula (3), Cu represents divalent copper, t-$C_4H_9$ represents a tertiary-butyl group, and substitution positions of four substituents thereof are either of $A_1$ or $A_2$, either of $A_3$ or $A_4$, either of $A_5$ or $A_6$, and either of $A_7$ or $A_8$ in Formula (2).

5. The polymerizable composition for an optical material according to claim 1,
wherein the UV absorber (C) includes one or more compounds selected from the group consisting of a benzophenone-based compound, a triazine-based compound, and a benzotriazole- based compound.

6. The polymerizable composition for an optical material according to claim 1, further comprising a polythiol compound (E).

7. An optical material formed of a cured product of the polymerizable composition for an optical material according to claim 1.

8. A process for preparing a polymerizable composition for an optical material, comprising:
a step of dissolving an organic coloring matter (B) in a polymerization catalyst (D) so as to obtain a mixed solution; and
a step of mixing an episulfide compound (A), an UV absorber (C), and the mixed solution so as to obtain the polymerizable composition for an optical material,
wherein the organic coloring matter (B) has a main absorption peak (P) between 565 nm and 605 nm in a visible light absorption spectrum measured with a chloroform or toluene solution of the organic coloring matter (B), an absorption coefficient (ml/g·cm) of a peak apex (Pmax) exhibiting a maximum absorption coefficient of the peak (P) is equal to or greater than $0.5 \times 10^5$, a peak width in an absorbance of ¼ of an absorbance of the peak apex (Pmax) of the peak (P) is equal to or less than 50 nm, a peak width in an absorbance of ½ of the absorbance of the peak apex (Pmax) of the peak (P) is equal to or less than 30 nm, and a peak width in an absorbance of ⅔ of the absorbance of the peak apex (Pmax) of the peak (P) is in a range of equal to or less than 20 nm,
wherein the organic coloring matter (B) is a tetraazaporphyrin compound represented by Formula (2),

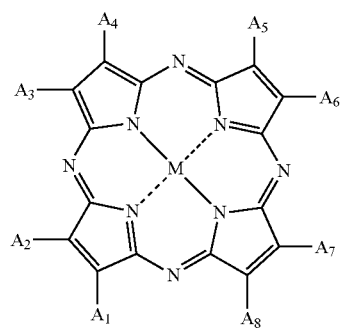

(2)

in Formula (2), $A_1$ to $A_8$ each independently represent a hydrogen atom, a halogen atom, a nitro group, a cyano group, a hydroxy group, an amino group, a carboxyl group, a sulfonic acid group, a linear, branched or cyclic alkyl group having 1 to 20 carbon atoms, an alkoxy group having 1 to 20 carbon atoms, an aryloxy group having 6 to 20 carbon atoms, a monoalkylamino group having 1 to 20 carbon atoms, a dialkylamino group having 2 to 20 carbon atoms, a dialkylamino group having 7 to 20 carbon atoms, an aralkyl group having 7 to 20 carbon atoms, an aryl group having 6 to 20 carbon atoms, a heteroaryl group, an alkylthio group having 6 to 20 carbon atoms, and an arylthio group having 6 to 20 carbon atoms, $A_1$ to $A_8$ may form a ring other than an aromatic ring, through a linking group, and M represents two hydrogen atoms, a divalent metal atom, a divalent monosubstituted metal atom, a tetravalent disubstituted metal atom, or an oxy metal atom, and wherein the polymerization catalyst (D) is an amine compound.

9. The process for preparing a polymerizable composition for an optical material according to claim 8,
wherein the episulfide compound (A) is a compound represented by Formula (1),

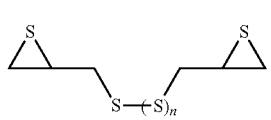

(1)

in Formula (1), n represents 0 or 1.

10. The process for preparing a polymerizable composition for an optical material according to claim 8,
wherein, in a tetraazaporphyrin compound represented by Formula (2), M represents a divalent copper atom.

11. The process for preparing a polymerizable composition for an optical material according to claim 8,
wherein the tetraazaporphyrin compound is represented by Formula (3),

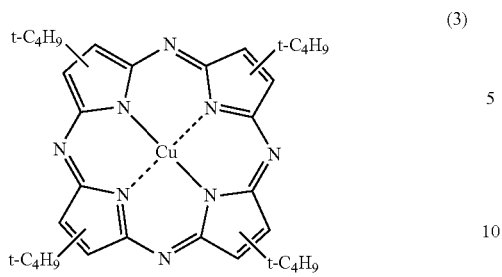 (3)

in Formula (3), Cu represents divalent copper, t-$C_4H_9$ represents a tertiary-butyl group, and substitution positions of four substituents thereof are either of $A_1$ or $A_2$, either of $A_3$ or $A_4$, either of $A_5$ or $A_6$, and either of $A_7$ or $A_8$ in Formula (2).

12. The process for preparing a polymerizable composition for an optical material according to claim 8, wherein the UV absorber (C) includes one or more compounds selected from the group consisting of a benzophenone-based compound, a triazine-based compound, and a benzotriazole-based compound.

13. The process for preparing a polymerizable composition for an optical material according to claim 10, further comprising a polythiol compound (E).

14. A method of manufacturing an optical material, comprising:
    a step of heating and curing a polymerizable composition for an optical material obtained by the preparation process according to claim 8.

* * * * *

UNITED STATES PATENT AND TRADEMARK OFFICE
CERTIFICATE OF CORRECTION

PATENT NO. : 10,954,341 B2
APPLICATION NO. : 15/759683
DATED : March 23, 2021
INVENTOR(S) : Naoyuki Kakinuma et al.

Page 1 of 1

It is certified that error appears in the above-identified patent and that said Letters Patent is hereby corrected as shown below:

In the Claims

Column 23, Line 24:
"13. The process for preparing a polymerizable composition for an optical material according to claim 10, further comprising a polythiol compound (E)."
Should read:
-- 13. The process for preparing a polymerizable composition for an optical material according to claim 8, further comprising a polythiol compound (E). --

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*